United States Patent
Pan et al.

(10) Patent No.: US 9,453,902 B2
(45) Date of Patent: Sep. 27, 2016

(54) DEAD ZONE LOCATION DETECTION APPARATUS AND METHOD

(71) Applicant: INTEL CORPORATION, Santa Clara, CA (US)

(72) Inventors: Xiaoyong Jacky Pan, Shanghai (CN); Justin Lipman, Shanghai (CN); Robert A. Colby, Granite Bay, CA (US)

(73) Assignee: Intel Corporation, Santa Clara, CA (US)

( * ) Notice: Subject to any disclaimer, the term of this patent is extended or adjusted under 35 U.S.C. 154(b) by 535 days.

(21) Appl. No.: 13/993,671

(22) PCT Filed: Mar. 13, 2013

(86) PCT No.: PCT/CN2013/072532
§ 371 (c)(1),
(2) Date: Jun. 12, 2013

(87) PCT Pub. No.: WO2014/139101
PCT Pub. Date: Sep. 18, 2014

(65) Prior Publication Data
US 2015/0369900 A1    Dec. 24, 2015

(51) Int. Cl.
*G01S 5/02* (2010.01)
*H04W 64/00* (2009.01)
(Continued)

(52) U.S. Cl.
CPC ............ *G01S 5/0252* (2013.01); *G01S 5/0263* (2013.01); *H04B 17/318* (2015.01); *H04W 4/021* (2013.01);
(Continued)

(58) Field of Classification Search
CPC .... G01S 5/0252; G01S 5/0263; G01S 19/48; H04B 17/318; H04W 4/021; H04W 4/027; H04W 4/028; H04W 4/04

USPC .................. 455/456.1, 456.6, 457
See application file for complete search history.

(56) References Cited

U.S. PATENT DOCUMENTS

2009/0132197 A1* 5/2009 Rubin ............... H04M 1/72563
702/141
2009/0312005 A1* 12/2009 Mukundan ............ H01L 1/0002
455/422.1
(Continued)

FOREIGN PATENT DOCUMENTS

| CN | 101001432 A | 7/2007 |
| CN | 101242624 A | 8/2008 |

(Continued)

OTHER PUBLICATIONS

International Search Report and Written Opinion for International Application No. PCT/CN2013/072532, 12 pages, Dec. 2013
(Continued)

*Primary Examiner* — Barry Taylor
(74) *Attorney, Agent, or Firm* — Schwabe, Williamson & Wyatt, P.C.

(57) ABSTRACT

Embodiments of techniques and systems for dead-zone-location detection in wireless systems are described. In embodiments, a wireless device may be configured to receive radio signals and provide indicators that convey signal strength of received radio signals. The received radio signals are considered degraded when signal strength of the received radio signals is below a threshold level. The wireless device may also be configured to determine which dead zone the wireless device is currently located, in response to a determination that receipt of radio signals is degraded. Other embodiments may be described and claimed.

15 Claims, 7 Drawing Sheets

(51) Int. Cl.
   *H04B 17/318*  (2015.01)
   *G01S 19/48*  (2010.01)
   *H04W 4/02*  (2009.01)
   *H04W 4/04*  (2009.01)
   *H04W 16/18*  (2009.01)

(52) U.S. Cl.
   CPC ........... *H04W 4/027* (2013.01); *H04W 64/006* (2013.01); *G01S 19/48* (2013.01); *H04W 4/028* (2013.01); *H04W 4/04* (2013.01); *H04W 16/18* (2013.01)

(56) References Cited

U.S. PATENT DOCUMENTS

| | | | |
|---|---|---|---|
| 2010/0225481 A1* | 9/2010 | Alberte, Jr. | A61B 5/0006 340/572.1 |
| 2014/0141803 A1* | 5/2014 | Marti | H04W 4/043 455/456.2 |
| 2014/0330535 A1* | 11/2014 | Van Den Heuvel | B66B 1/3492 702/141 |

FOREIGN PATENT DOCUMENTS

| | | |
|---|---|---|
| CN | 102571389 A | 7/2012 |
| CN | 102821356 A | 12/2012 |

OTHER PUBLICATIONS

International Preliminary Report on Patentability mailed Sep. 24, 2015 for International Application No. PCT/CN2013/072532, 8 pages.

* cited by examiner

DEAD ZONE LOCATION DETECTION APPARATUS AND METHOD

CROSS REFERENCE TO RELATED APPLICATIONS

The present application is a national phase entry under 35 U.S.C. §371 of International Application No. PCT/CN2013/072532, filed Mar. 13, 2013, entitled "DEAD ZONE LOCATION DETECTION APPARATUS AND METHOD", which designated, among the various States, the United States of America. The Specification of the PCT/CN2013/072532 Application is hereby incorporated by reference.

TECHNICAL FIELD

The present disclosure relates generally to wireless communication, and more particularly, to methods and apparatus for dead-zone-location detection.

BACKGROUND

A number of technologies attempt to identify the location of an object in indoor environment by estimating the distance between the devices and known beacon locations. In some such methods, a wireless device measures the received strength of wireless signals sent by multiple beacons, applies a wireless propagation model to the received signal strength values to estimate the distances between the mobile device and the beacons, and may apply a trilateration technique to the estimated distances to identify a likely location of the mobile device.

Location fingerprinting is another technique may be used for identifying location on 802.11 Wireless Local Area Networks (WLANs). A radio map of observed Signal Strength (SS) values from various locations may be obtained through a calibration process. Afterwards, proximity-matching algorithms may be used to identify location by comparing SS values observed at a wireless device to the radio map values.

However, there are many areas in indoor environments, commonly referred as "dead zones" where wireless signals are very weak or blocked such as in elevators and stairwells. In these areas neither trilateration nor fingerprinting can be effectively used to identify location.

BRIEF DESCRIPTION OF THE DRAWINGS

Embodiments will be readily understood by the following detailed description in conjunction with the accompanying drawings. To facilitate this description, like reference numerals designate like structural elements. Embodiments are illustrated by way of example, and not by way of limitation, in the figures of the accompanying drawings.

DETAILED DESCRIPTION

Embodiments of techniques and systems for dead-zone-location detection in wireless systems are described. In embodiments, a wireless device may be configured to receive radio signals and provide indicators that convey signal strength of received radio signals. The received radio signals may be considered degraded when signal strength of the received radio signals is below a threshold level. The threshold level may, e.g., be a level where the wireless device is no longer able to support common location techniques, such as trilateration or fingerprint. The wireless device may also be configured to determine which dead zone the wireless device is currently located, in response to a determination that receipt of radio signals is degraded. The dead zone may, e.g. be inside a particular elevator.

In the following detailed description, reference is made to the accompanying drawings which form a part hereof wherein like numerals designate like parts throughout, and in which is shown by way of illustration embodiments that may be practiced. It is to be understood that other embodiments may be utilized and structural or logical changes may be made without departing from the scope of the present disclosure. Therefore, the following detailed description is not to be taken in a limiting sense, and the scope of embodiments is defined by the appended claims and their equivalents.

Various operations may be described as multiple discrete actions or operations in turn, in a manner that is most helpful in understanding the claimed subject matter. However, the order of description should not be construed as to imply that these operations are necessarily order dependent. In particular, these operations may not be performed in the order of presentation. Operations described may be performed in a different order than the described embodiment. Various additional operations may be performed and/or described operations may be omitted in additional embodiments.

For the purposes of the present disclosure, the phrase "A and/or B" means (A), (B), or (A and B). For the purposes of the present disclosure, the phrase "A, B, and/or C" means (A), (B), (C), (A and B), (A and C), (B and C), or (A, B and C).

The description may use the phrases "in an embodiment," or "in embodiments," which may each refer to one or more of the same or different embodiments. Furthermore, the terms "comprising", "including", "having", and the like, as used with respect to embodiments of the present disclosure, are synonymous.

As may be used herein, the term "module" may refer to, be part of, or include an Application Specific Integrated Circuit (ASIC), an electronic circuit, a processor (shared, dedicated, or group) and/or memory (shared, dedicated, or group) that execute one or more software or firmware programs, a combinational logic circuit, and/or other suitable components that provide the described functionality.

Figure 1:
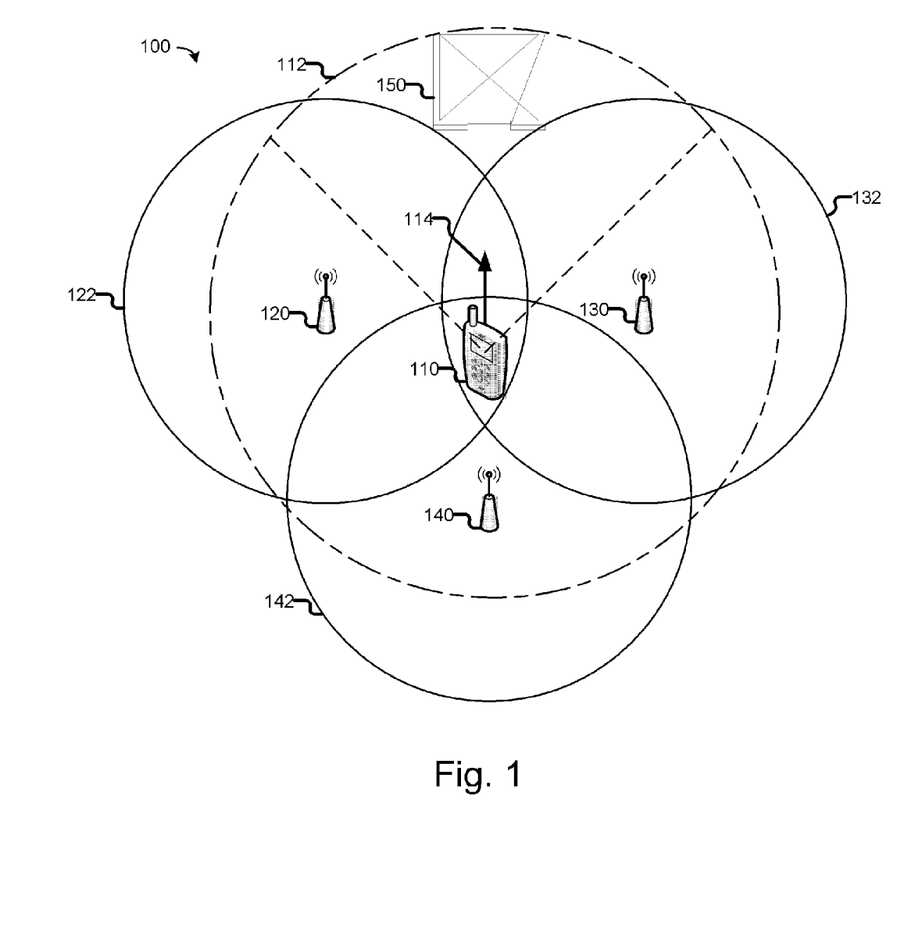
FIG. 1 is a schematic diagram illustrating an example wireless communication environment, incorporating aspects of the present disclosure, in accordance with various embodiments.

Referring now to FIG. 1, an example wireless communication environment 100, in accordance with various embodiments, is illustrated. Wireless communication environment 100 may include access points (AP) 120, 130, and 140 belonging to one or more wireless networks, such as wireless personal area network (WPAN), wireless local area networks (WLAN), wireless metropolitan area network (WMAN), or other types of communication networks. Moreover, AP 120, 130, and 140 may have their respective effective coverage area 122, 132, and 142 where wireless signal strength is theoretically strong if not dampened by environment in supporting location techniques, such as trilateration or fingerprinting. Furthermore, each access point may be associated with a known location in an indoor environment.

Wireless communication environment 100 may also include a user device 110. As will be described in more detail below, user devices may be incorporated with the teachings of the present disclosure to detect dead-zone-location. User devices in wireless communication environment 100 may include wireless electronic devices such as a desktop computer, a laptop computer, a handheld computer, a tablet computer, a cellular telephone, a pager, an audio and/or video player (e.g., an MP3 player or a DVD player), a gaming device, a video camera, a digital camera, a navigation device (e.g., a GPS device), a wireless peripheral (e.g., a printer, a scanner, a headset, a keyboard, a mouse, etc.), a medical device e.g., a heart rate monitor, a blood pressure monitor, etc,), and/or other suitable fixed, portable, or mobile electronic devices.

In embodiments, user device 110 may be mobile in wireless communication environment 100 with a detected moving speed and moving direction 114. User device 110 may be roaming anywhere within area 112 radiated from its current location. However, with detected moving direction 114 of user device 110, it is more likely that user device 110 may be located within the upper sector of area 112.

User device 110 may use a variety of modulation techniques such as spread spectrum modulation (e.g., direct sequence code division multiple access (DS-CDMA) and/or frequency hopping code division multiple access (FH-CDMA)), time-division multiplexing (TDM) modulation, frequency-division multiplexing (FDM) modulation, orthogonal frequency-division multiplexing (OFDM) modulation, multi-carrier modulation (MDM) and/or other suitable modulation techniques to communicate with AP 120, 130, or 140 via wireless links.

In one example, user device 110 may operate in accordance with suitable wireless communication protocols that require very low power such as Bluetooth® ultra-wide band (UWB), and/or radio frequency identification (RFID) to implement WPAN. In another example, user device 110 may use direct sequence spread spectrum (DSSS) modulation and/or frequency hopping spread spectrum (FHSS) modulation to implement the WLAN (e.g., the 802.11 family of standards developed by the Institute of Electrical and Electronic Engineers (IEEE) and/or variations and evolutions of these standards).

User device 110 may use OFDM modulation to transmit large amounts of digital data by splitting a radio frequency signal into multiple small sub-signals, which in turn, are transmitted simultaneously at different frequencies. In particular, user device 110 may use OFDM modulation to implement WMAN. For example, user device 110 may operate in accordance with the 802.16 family of standards developed by IEEE to provide for fixed, portable, and/or mobile broadband wireless access (BWA) networks (e.g., the IEEE std. 802.16-2004 (published Sep. 18, 2004), the IEEE std. 802.16e (published Feb. 28, 2006), the IEEE std. 802.16f (published Dec. 1, 2005), etc.) to communicate with base stations via wireless link(s).

Although some of the above examples are described above with respect to standards developed by IEEE, the present disclosure is readily applicable to many specifications and/or standards developed by other special interest groups and/or standard development organizations Wireless Fidelity (Wi-Fi) Alliance, Worldwide Interoperability for Microwave Access (WiMAX) Forum, Infrared Data Association (IrDA), Third Generation Partnership Project (3GPP), etc).

One or more wireless networks associated with APs 120, 130, and 140 may be operatively coupled to a common public or private network such as the Internet, a telephone network (e.g., public switched telephone network (PSTN)), a local area network (LAN), a cable network, and/or another wireless network via connection to an Ethernet, a digital subscriber line (DSL), a telephone line, a coaxial cable, and/or any wireless connection, etc.

Wireless communication environment 100 may include other suitable wireless communication networks. For example, wireless communication environment 100 may include a wireless wide area network (WWAN) (not shown). User device 110 may operate in accordance with other wireless communication protocols to support a WWAN. In particular, these wireless communication protocols may be based on analog, digital, and/or dual-mode communication system technologies such as Global System for Mobile Communications (GSM) technology, Wideband Code Division Multiple Access (WCDMA) technoloy, General Packet Radio Services (GPRS) technology, Enhanced Data GSM Environment (EDGE) technology, Universal Mobile Telecommunications System (UMTS) technology, Third Generation Partnership Project (3GPP) technology, standards based on these technologies, variations and evolutions of these standards, and/or other suitable wireless communication standards. Wireless communication environment 100 may include various combinations of WPANs, WLANs, WMANs, and/or WWANs.

Wireless communication environment 100 may include other WPAN, WLAN, WMAN, and/or WWAN devices (not shown) such as network interface devices and peripherals (e.g., network interface cards (NICs)), access points (APs), redistribution points, end points, gateways, bridges, hubs, etc. to implement a cellular telephone system, a satellite system, a personal communication system (PCS), a two-way radio system, a one-way pager system, a two-way pager system, a personal computer (PC) system, a personal data assistant (PDA) system, a personal computing accessory (PCA) system, and/or any other suitable communication system.

Wireless communication environment 100 may additionally include dead zone 15 such as in elevators and stairwells, where wireless signals are very weak or blocked. In embodiments, wireless device 110, incorporating aspects of the present disclosure, may be configured to detect its location in dead zone 150 with even degraded wireless signals.

Figure 2:
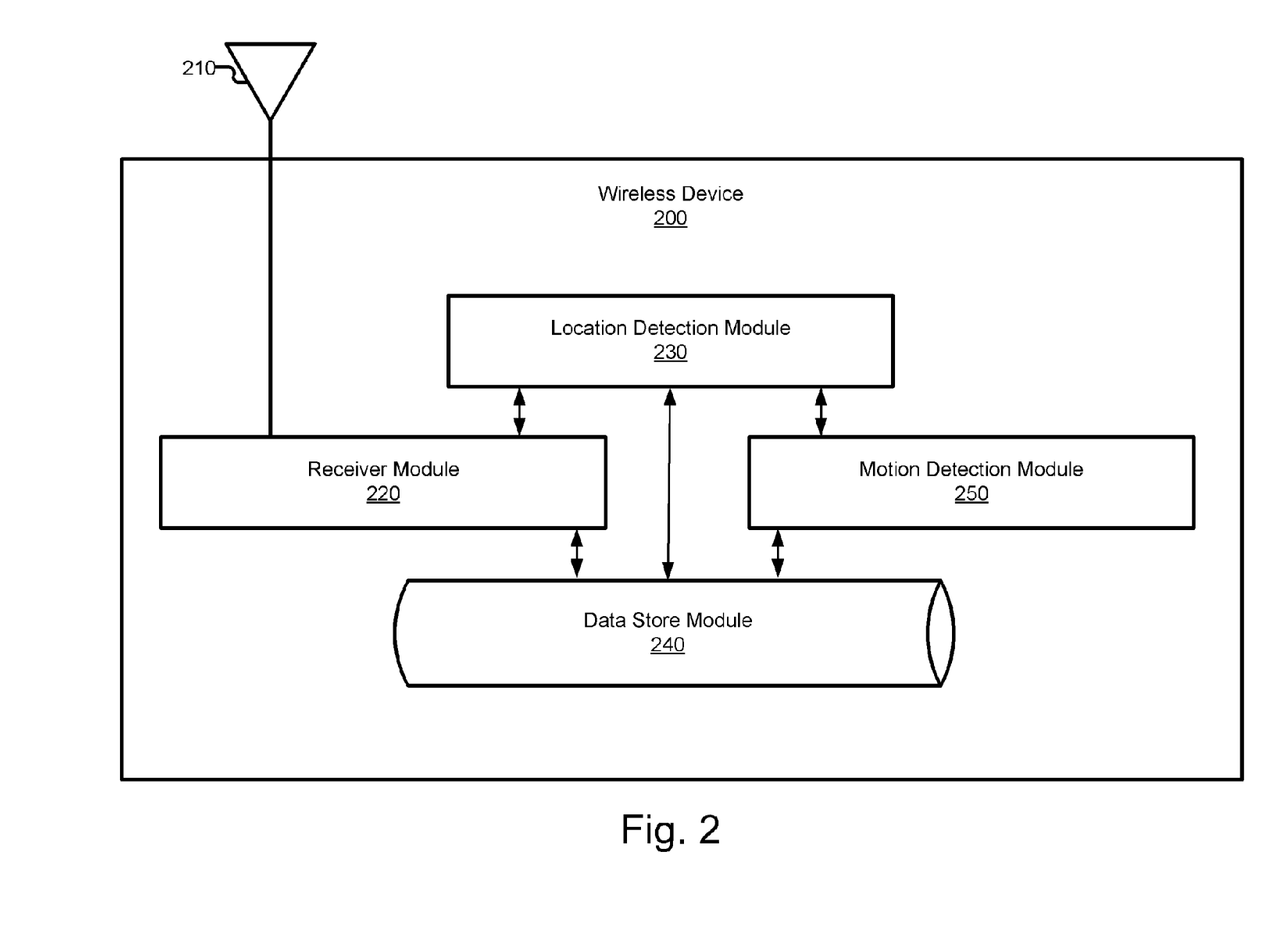
FIG. 2 is a block diagram illustrating an example wireless device, incorporating aspects of the present disclosure, in accordance with various embodiments.

Referring now to FIG. 2, an example wireless device 200 is illustrated, in accordance with various embodiments. The components of wireless device 200, discussed in detail below, may be included in any one or more of the devices discussed above with reference to FIG. 1, including user device 110 or any other suitable wireless device. In some embodiments, wireless device 200 is a mobile wireless device, such as a PDA, cellular telephone, smartphone, tablet computer or laptop computer.

Wireless device 200 may include antenna 210. Antenna 210 may include one or more directional or omni-directional antennas such as dipole antennas, monopole antennas, patch antennas, loop antennas, microstrip antennas, and/or other types of antennas suitable for reception of radio frequency (RF) or other wireless communication signals. Although FIG. 2 depicts a single antenna, wireless device 200 may include additional antennas.

Antenna 210 may be coupled to receiver module 220. Receiver module 220 may be configured to receive wireless signals transmitted from other wireless devices, such as any of the devices discussed above with reference to FIG. 1. In some embodiments, antenna 210 may also be suitable for transmission of wireless communications signals to one or more reference points, and may be coupled to a transmission module (not shown) of wireless device 200. In some embodiments, receiver module 220 may be configured to receive and distinguish between wireless signals transmitted from one or more reference points in a wireless communication environment (such as wireless communication environment 100 of FIG. 1). As used herein, a "reference point" may refer to a source of wireless signals that is part of a spatial arrangement of other wireless signal sources whose locations are known or partially known. As used herein, "location" may refer to an absolute location (e.g., a geodetic location) or a relative location (e.g., relative to other reference points or to non-reference point landmarks, such as building boundaries). In some embodiments, a reference point may include an access point, such as AP 120, 130, or 140 of FIG 1.

Receiver module 220 may be configured to extract information from a wireless signal received from a reference point. In some embodiments, this information may include information about the reference point itself, including the location of the reference point, the signal strength at which the reference point transmits wireless signals, a time at which transmission of a wireless signal was initiated, or an identifier of the reference point (e.g., a device name or number), among others. In some embodiments, this information may be communicated in a frame transmitted in the wireless signals (e.g., a WiFi beacon frame). In some embodiments, receiver module 220 may be configured to measure characteristics of a received wireless signal, such as a received signal strength (RSS) of a wireless signal, a time at which a wireless signal was received, a bearing from which a wireless signal was received, and/or other types of information about a received wireless signal.

In some embodiments, this information received by receiver module 220 may include information related to a reference point. For example, this information may include a list of predefined dead zones around the reference point and characteristics of each predefined dead zone. The list of predefined dead zones may be a completed list of dead zones in an indoor environment or a partial list of dead zones only within a predetermined range around the reference point. The characteristics of a dead zone may include the category of a dead zone, such as elevator, stairs, etc. The characteristics of a dead zone may include spatial characteristics of a dead zone, such as location (relative or geodetic), shape, size, height, width, etc. The characteristics of a dead zone may also include temporal characteristics of a dead zone, such as when the dead zone may appear or disappear. The characteristics of a dead zone may also include inherent motion characteristics of the dead zone, such as the vertical or horizontal acceleration pattern of the dead zone.

Information about or related to a reference point may be stored in data store module 240. In some embodiments, such information may include reference points that may potentially be in communication with wireless device 200 (e.g., reference points located in the same building as wireless device 200, or located within a given proximity). In some embodiments, such information may include geodetic location data about reference points, such as latitude and longitude coordinates or coordinates in another coordinate system (e.g., with reference to one or more other reference points). In some embodiments, such information may include relative location data of reference points (e.g., representative of distances and/or angles between different reference points within some coordinate system). In some embodiments, such information may include data representative of the floor in a building on which different reference points are located. In some embodiments, such information may include data representative of boundaries of a building in which the reference points are located. In some embodiments, such information may include predefined dead zones that may potentially be encountered by wireless device 200.

In some embodiments, such information may be wirelessly downloaded from a wireless information source to data store module 240. In some embodiments, such information may be retrieved remotely from a remote server. In some embodiments, such information may be retrieved locally from a local server. In some embodiments, such information may be dynamically learned from an indoor environment. In some embodiments, such a download or retrieval may occur automatically when, for example, wireless device 200 first enters a building that contains reference points, or when a user of wireless device 200 first logs on to a website containing such information in a particular area. In some embodiments, such information may be downloaded, or entered into wireless device 200 manually. As discussed above, in some embodiments, receiver module 220 may extract at least a portion of such information from one or more reference point frames transmitted by one or more reference points (e.g., one or more WiFi beacon frames).

Wireless device 200 may include motion detection module 250. In embodiments, motion detection module 250 may use one or more motion detection sensors (not shown), such as accelerometers, to detect direction and speed of movement of wireless device 200. Motion information may include velocity and acceleration information of wireless device 200. In embodiments, the position of wireless device 200 may be further determined via dead reckoning (DR) without the need for external references where DR is the process of calculating one's current position by advancing from a previously determined position based upon known or estimated speeds over elapsed time and course. In embodiments, the position of wireless device 200 may be fixed or calibrated via the help of one or more external references. In embodiments, motion information of wireless device 200, including direction, course, velocity, acceleration, time elapsed, etc., may be stored in data store module 240.

Wireless device 200 may include location detection module 230. In embodiments, location detection module 230 may be coupled with and configured to communicate with receiver module 220, motion detection module 250, and data store module 240. In embodiments, location detection module 230 may be configured to determine the absolute or relative location of wireless device 200 using trilateration and/or fingerprinting in indoor environment when RSS supports such techniques. In some embodiments, location detection module 230 may implement a trilateration technique, such as the method of circles, the method of triangles, or the method of spheres, among others. In some embodiments, location detection module 230 may implement a multilateration technique. In some embodiments, location detection module 230 may implement a fingerprinting technique.

In embodiments, location detection module 230 may be configured to determine whether wireless device 200 is located in a dead zone when signal strength of the received radio signals has fallen below a predetermined threshold level. The threshold level may, e.g., be a level where trilateration or fingerprinting techniques are deemed unreliable. The level may be application dependent, e.g., on the need for precision. In embodiments, location detection module 230 may be configured to obtain a last know location of wireless device 200 that is deemed accurate, a list of predefined dead zones within a range of the last known location deemed accurate, and/or motion information of wireless device 200 from data store module 240. Location detection module 230 may be configured to then subsequently determine a location of the computing device in a dead zone near the last known location deemed accurate.

In embodiments, the dead zone of wireless device 200 may be selected from the list of predefined dead zones within a range of the last known location deemed accurate. In embodiments, the dead zone of wireless device 200 may be learned or dynamically defined base at least in part on the last known location deemed accurate and motion information of wireless device 200. In embodiments, the location of wireless device 200 in the dead zone may be reported to a user via a selected one of audio output, visual output, or tactile output. For example, the location information of wireless device 200 in a dead zone may be displayed in a map to be viewable to the user.

Embodiments of the present disclosure may detect the dead-zone-location of wireless device 200 with degraded RSS. Moreover, such detection may be achieved with computational tractability, limited required knowledge of environmental conditions such as building materials and orientation of the wireless device, adaptability to changes in environmental and other factors that affect the propagation of wireless signals (such as antenna obstruction and movement of the wireless device between rooms, hallways and open spaces), and applicability to different devices with different antenna gains without the need for extensive modification, among others.

Figure 3:
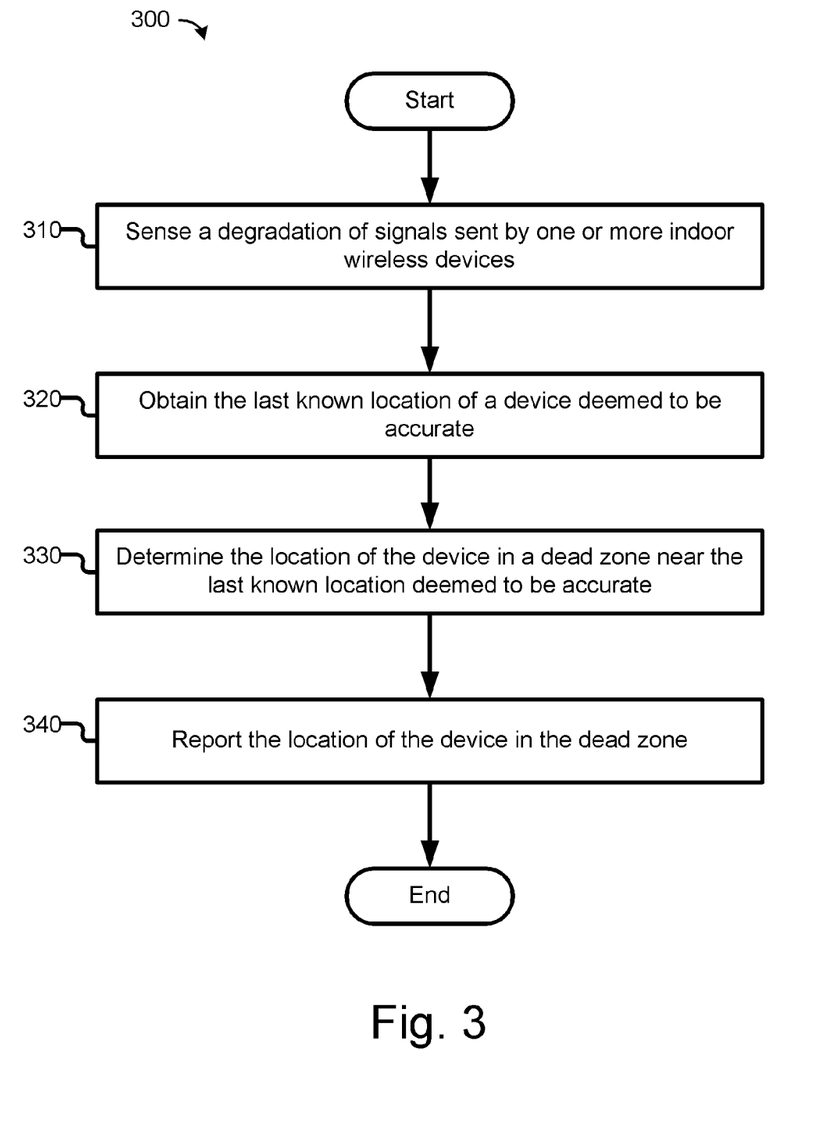
FIG. 3 is a flow diagram of an example dead-zone-location detection and report process executable by a wireless device, incorporating aspects of the present disclosure, in accordance with various embodiments.

FIG. 3 is a flow diagram of an example dead-zone-location detection and report process 300 of a location detection wireless device, such as the user device 110 of FIG. 1 or the wireless device 200 of FIG. 2, in accordance with various embodiments. It may be recognized that, while the operations of process 300 are arranged in a particular order and illustrated once each, in various embodiments, one or more of the operations may be repeated, omitted, combined, or performed out of order. For illustrative purposes, operations of the process 300 and other processes described herein may be described as performed by wireless device 200 (FIG. 2), or any suitably configured device (e.g., a programmed processing system, an ASIC, or another wireless computing device).

The process 300 may begin at operation 310, in which wireless device 200 may sense a degradation of signals sent by multiple indoor wireless devices. Wireless device 200 may determine, for given reference point and corresponding received wireless signal, a received signal strength value. In some embodiments, a received signal strength value is representative of the power present in a received wireless signal. Thus power measures may become indicators that convey signal strength of received radio signals. A received signal strength value may be measured in any suitable units, such as volts (V), milliwatts (mW), decibels (dB) or a manufacturer- or communication protocol-specific unit. For example, the received signal strength value determined by wireless device 200 at operation 310 may be a received signal strength indicator (RSSI) associated with the IEEE 802.11 communications standard.

In some embodiments, operation 310 may be performed by processing circuitry and/or firmware included in receiver module 220 (FIG. 2). In embodiments, the received radio signals may be considered degraded when signal strength of the received radio signals is below a threshold level. The threshold level may be a level where results of common location techniques, such as trilateration or fingerprinting, are no longer deemed reliable. Each of the multiple wireless signals received or fail to be received at operation 310 may be transmitted from a different reference points in wireless communication with wireless device 200. Weakened signals from one or more reference points may not trigger operation 310 if the remaining signals from other reference points are sufficient in sustaining trilateration, fingerprinting, or other location techniques.

In embodiments, the threshold level associated with a particular reference point may be retrieved in advance and stored in data store module 240 in connection with various embodiments described above with reference to data store module 240 (FIG. 2), including wirelessly downloading such information. In embodiments, the threshold level associated with a particular reference point may be broadcasted in real time, thus retrievable dynamically by wireless device 200.

As discussed above with reference to data store module 210 of FIG. 2, the spatial arrangement (e.g., absolute or relative location) of the reference points may be known or partially known to wireless device 200 or to another device in communication with wireless device 200 (e.g., a server device). Operation 310 may include any of the embodiments described above with reference to data store module 240 (FIG. 2), including wirelessly downloading information of or related to a reference point from frames of the wireless signal transmitted from the reference point, for example. In some embodiments, wireless device 200 obtains information of or related to a reference point before or after receiving wireless signals at operation 310.

At operation 320, wireless device 200 may obtain the last known location of wireless device 200 deemed accurate. As discussed above, wireless device 200 may execute any one or more location techniques in detecting location of wireless device 200. Suitable location techniques may include two- or three-dimensional trilateration techniques, two- or three-dimensional multilateration techniques, fingerprinting, and other techniques while RSS suffice in supporting such location techniques. In embodiments, the last known location of wireless device 200 deemed accurate may be the last known location determined via either trilateration or fingerprinting techniques before signal degradation. In embodiments, the last known location of wireless device 200 deemed accurate may be stored and ready to be retrieved from data store module 240.

At operation 330, the location of wireless device 200 in a dead zone near the last known location deemed accurate may be determined, for example, through location detection module 230. As discussed above, location detection module 230 may be configured to determine which dead zone the apparatus is currently located, based at least in part on known dead zones around the last known location of wireless device 200 that is deemed accurate, and motion information of wireless device 200 subsequent to the known location of wireless device 200 last deemed accurate. Particular embodiments of operation 330 are described below with reference to process 400 of FIG. 4.

At operation 340, wireless device 200 may report the location of wireless device 200 in the dead zone. For example, wireless device 200 may generate an indication of the location in the dead zone in a map based at least in part on information of the dead zone, such as the size or other information of the dead zone. Process 300 may then end.

Figure 4:
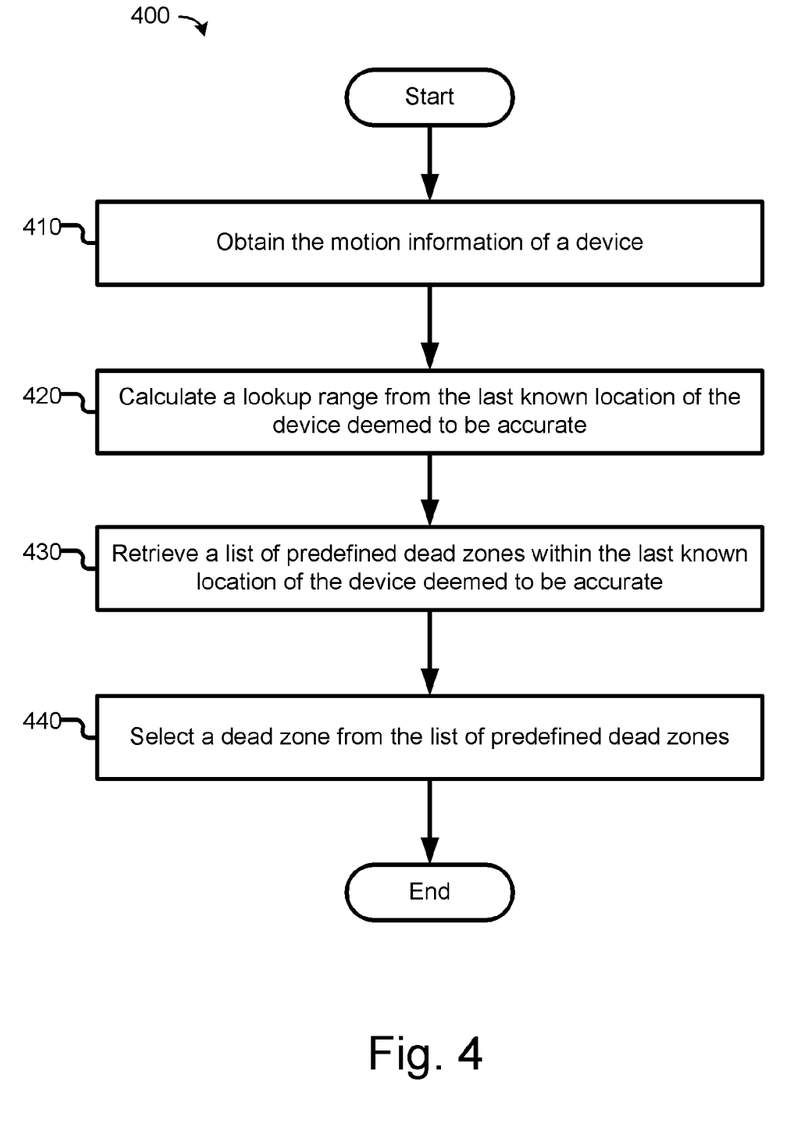
FIG. 4 is a flow diagram of an example dead zone selection process, incorporating aspects of the present disclosure, in accordance with various embodiments.

Referring now to FIG. 4, a flow diagram is provided of an example dead zone selection process 400, in accordance with various embodiments. As discussed above, dead zone selection process 400 may be included in operation 330 of process 300 (FIG. 3). For illustrative purposes, operations of the process 400 and other processes described herein may be described as performed by user device 110 (FIG. 1), or any suitably configured device (e.g., a programmed processing system, an ASIC, or another wireless computing device).

At operation 410, the motion information of user device 110 may be obtained either from motion detection module 250 or data store module 240. In connection with various embodiments described above with reference to motion detection module 250 and data store module 240 (FIG. 2), the motion information of user device 110 may include direction, course, velocity, acceleration, time elapsed, etc. of user device 110, thus forming a pattern of motion or motion characteristics of user device 110.

At operation 420, a lookup range from the last known location of user device 110 deemed accurate may be calculated. The last known location of user device 110 deemed accurate may be obtained in connection with operation 320 (FIG. 3). In embodiments, the lookup range may be determined by $R=V*T+f$, wherein V is the velocity of user device 110; T is the time elapsed since the last known location of user device 110 deemed accurate; and f is a factor reflecting error in the estimation or measurement of one or more of location, time and speed, for example, may be set to be in a range of 5 to 10 meters. The lookup range generally may indicate the distance traveled by user device 110 since the last known location of user device 110 deemed accurate. In embodiments, the velocity of user device 110 and time elapsed since the last known location may be retrieved in connection with operation 410. In embodiments, the velocity of user device 110 may be set to be the average human walking speed which is about 5.0 kilometers per hour (km/h), or about 3.1 miles per hour (mph). In embodiments, the velocity of user device 110 may be set according to various individual factors of the user such as age, fitness, load, height, weight, and effort; or various environmental factors such as terrain or surface.

In embodiments, the lookup range from the last known location of user device 110 deemed accurate may be further restricted by considering the moving direction of the device at the last known location. For example, referencing to the discussion associated with FIG. 1, user device 110 is more likely to be located within the upper sector of area 112 after a certain time interval in considering the detected moving direction 114 of user device 110.

At operation 430, a list of predefined dead zones within the last known location of the device deemed accurate may be retrieved. In embodiments, a comprehensive or partial list of predefined dead zones in an indoor environment may be already retrieved and stored in data store module 240 in connection with various embodiments described above with reference to data store module 240 (FIG. 2). The list of predefined dead zones within the last known location of the device deemed accurate may be selected from the comprehensive list stored in data store module 240 based on whether the spatial relationship between a predefined dead zone and the last known location is within the lookup range. In embodiments, the list of predefined dead zones within the last known location of the device deemed accurate may be queried through a server in real time if at least one AP in wireless communication environment 100 still support such operation.

At operation 440, a dead zone from the list of predefined dead zones within the last known location of the device deemed accurate may be selected as the dead-zone-location of user device 110. In embodiments, there may be no predefined dead zone found within the lookup range from the last known location of user device 110 deemed accurate. In this case, a new dead zone with associated motion characteristics of user device 110 may be created accordingly. In embodiments, there may be only one predefined dead zone found within a restricted look-up range from the last known location of user device 110 deemed accurate. In this case, that only one dead zone may be the dead zone that user device 110 is currently located.

In embodiments, there may be more than one dead zone even within a restricted lookup range from the last known location of user device 110 deemed accurate. The pattern of motion or motion characteristics of user device 110 may be compared with the known dead zone characteristics. A match of motion characteristics of user device 110 with a corresponding reference profile known for a dead zone may indicate the dead zone that user device 110 is currently located. Process 400 may then end. Particular example of a motion reference profile of a dead zone is described below with reference to FIG. 5.

Figure 5:
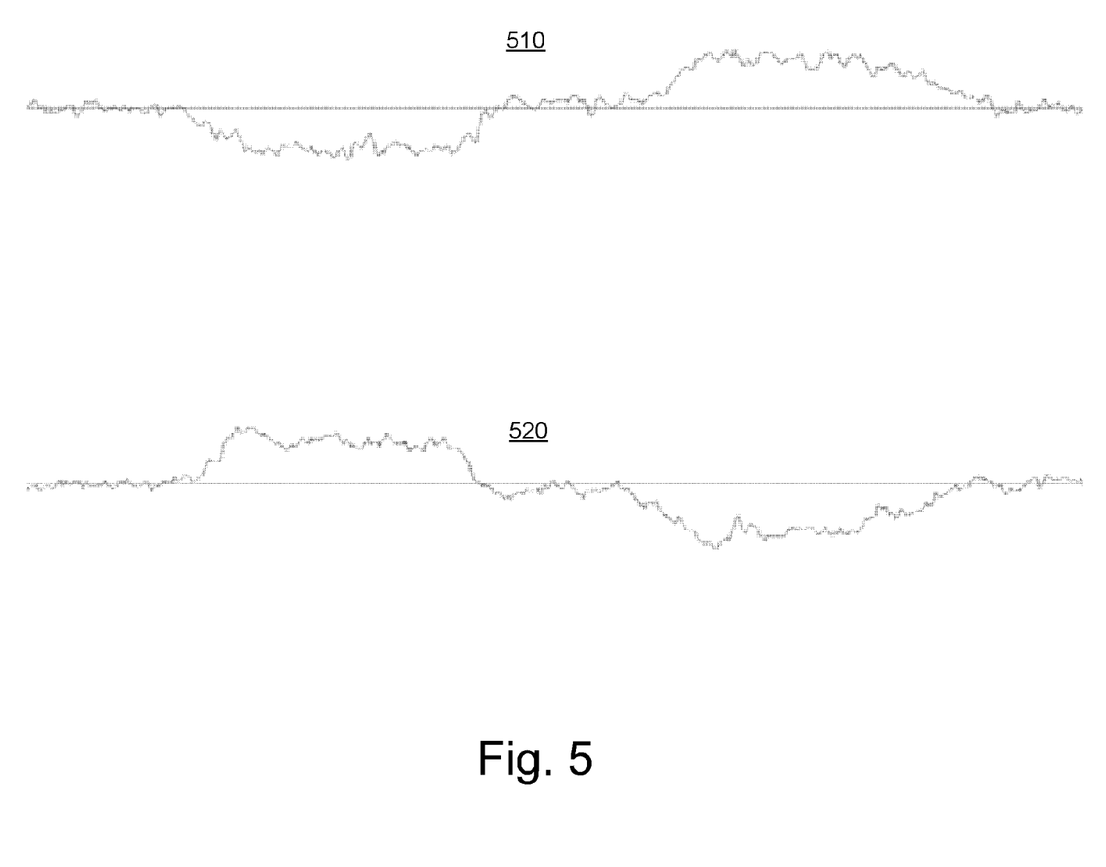
FIG. 5 illustrates a number of example reference profiles of a dead zone, incorporating aspects of the present disclosure, in accordance with various embodiments.

FIG. 5 illustrates a number of example reference profiles of a dead zone, incorporating aspects of the present disclosure, in accordance with various embodiments. In embodiments, user device 110 or wireless device 200 may be located in a dead zone of an elevator. Acceleration curve 510 depicts vertical acceleration change of user device 110 or wireless device 200 in a going-down elevator. A person skilled in the art may appreciated that the acceleration may increase downward during the acceleration stage of the movement, but may increase upward during the deceleration stage of the movement.

On the contrary, acceleration curve 520 depicts vertical acceleration change of wireless device 200 in a going-up elevator where the acceleration may increase upward during the acceleration stage of the movement, but may increase downward during the deceleration stage of the movement. In embodiments, the characteristics of acceleration curves 510 and 520 may be used to match the motion pattern of wireless device 200 in determining whether wireless device 200 may be located in an elevator-type dead zone.

Figure 6:
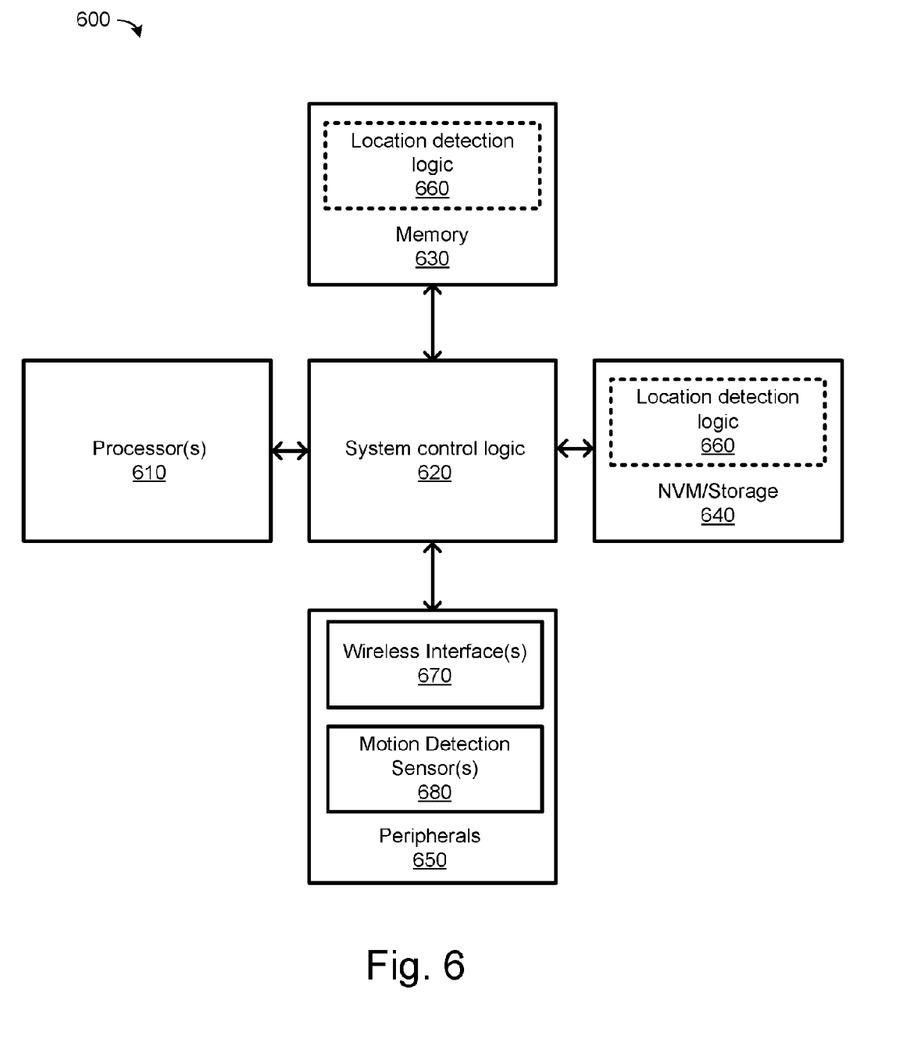
FIG. 6 illustrates an example computing device suitable for practicing the disclosed embodiments, in accordance with various embodiments.

FIG. 6 illustrates an embodiment of a computing device 600 suitable for practicing embodiments of the present disclosure. As illustrated, computing device 600 may include system control logic 620 coupled to one or more processor(s) 610, to system memory 630, to non-volatile memory (NVM)/storage 640, and to one or more peripherals 650. In various embodiments, the one or more processors 610 may include a processor core. In embodiments, peripherals 650 may include earlier described motion detection sensor(s) 680 in connection with FIG. 2. In embodiments, peripherals 650 may also include one or more communications interfaces, such as wireless interface(s) 670.

In some embodiments, system control logic 620 may include any suitable interface controllers to provide for any suitable interface to the processor(s) 610 and/or to any suitable device or component in communication with system control logic 620. System control logic 620 may also intemperate with a display (not shown) for display of information, such as to a user. In various embodiments, the display may include one of various display formats and forms, such as, for example, liquid-crystal displays, cathode-ray tube displays, and e-ink displays. In various embodiments, the display may include a touch screen.

In some embodiments, system control logic 620 may include one or more memory controller(s) (not shown) to provide an interface to system memory 630. System memory 630 may be used to load and store data and/or instructions, for example, for computing device 600. System memory 630 may include any suitable volatile memory, such as suitable dynamic random access memory (DRAM), for example.

In some embodiments, system control logic 620 may include one or more input/output (I/O) controller(s) (not shown) to provide an interface to NVM/storage 640 and peripherals 650. NVM/storage 640 may be used to store data and/or instructions, for example. NVM/storage 640 may include any suitable non-volatile memory, such as flash memory, for example, and/or may include any suitable non-volatile storage device(s), such as one or more hard disk drive(s) (HDD), one or more solid-state drive(s), one or more compact disc (CD) drive(s), and/or one or more digital versatile disc (DVD) drive(s), for example. NVM/storage 640 may include a storage resource that is physically part of a device on which computing device 600 is installed or it may be accessible by, but not necessarily a part of, computing device 600. For example, NVM/storage 640 may be accessed by computing device 600 over a network via one or more communications interface(s) within peripherals 650.

System memory 630, NVM/storage 640, and system control logic 620 may include, in particular, temporal and persistent copies of location detection logic 660. The location detection logic 660 may include instructions that, when executed by at least one of the processor(s) 610, result in computing device 600 practicing one or more aspects of wireless device 200 (FIG. 2) described above. Communications interface(s) within peripherals 650 may provide an interface for computing device 600 to communicate over one or more network(s) and/or with any other suitable device. Communications interface(s) within peripherals 650 may include any suitable hardware and/or firmware, such as a network adapter, one or more antennas (such as antenna 210 of FIG. 2), wireless interface(s) 670, and so forth. In various embodiments, communication interface(s) within peripherals 650 may include an interface for computing device 600 to use NFC, optical communications (e.g., barcodes), or other similar technologies to communicate directly (e.g.,.. without an intermediary) with another device. In various embodiments, wireless interface(s) 670 may interoperate with radio communications technologies such as, for example, WCDMA, GSM, LIE, Bluetooth®, Zigbee, and the like.

Depending on which modules of wireless device 200 (FIG. 2) are hosted by computing device 600, the capabilities and/or performance characteristics of processors 610, memory 630, and so forth, may vary. In various embodiments, when used to host receiver module 220, computing device 600 may include, but is not limited to, a smartphone, a computing tablet, a Ultrabook®, an e-reader, a laptop computer, a desktop computer, a set-top box, a game console, or a server. In various embodiments, when used to host data store module 240 (FIG. 2), computing device 600 may be, but not limited to, one or more servers known in the art.

In some embodiments, at least one of the processor(s) 610 may be packaged together with system control logic 620 and/or location detection logic 660. In some embodiments, at least one of the processor(s) 610 may be packaged together with system control logic 620 and/or location detection logic 660 to form a System in Package (SiP). In some embodiments, at least one of the processor(s) 610 may be integrated on the same die with system control logic 620 and/or location detection logic 660. In some embodiments, at least one of the processor(s) 610 may be integrated on the same die with system control logic 620 and/or location detection logic 660 to form a System on Chip (SoC).

In various implementations, computing device 600 may be a laptop, a netbook, a notebook, an subnotebook, an Ultrabook®, a smartphone, a tablet, a personal digital assistant, an ultra mobile PC, a mobile phone, a desktop computer, a server, a printer, a scanner, a monitor, a set-top box, an entertainment control unit (e.g., a gaming console), a digital camera, a digital music player, or a digital video recorder. Additionally, other devices in the above-described interactions may be configured to perform various disclosed techniques.

Figure 7:
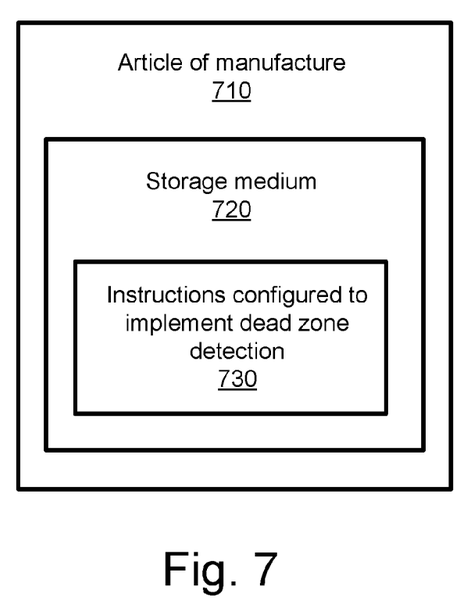
FIG. 7 illustrates an article of manufacture having programming instructions, incorporating aspects of the present disclosure, in accordance with various embodiments.

FIG. 7 illustrates an article of manufacture 710 having programming instructions, incorporating aspects of the present disclosure, in accordance with various embodiments. In various embodiments, an article of manufacture may be employed, to implement various embodiments of the present disclosure. As shown, the article of manufacture 710 may include a computer-readable non-transitory storage medium 720 where instructions configured to implement dead zone detection logic 730. The storage medium 720 may represent a broad range of persistent storage medium known in the art, including but not limited to flash memory, dynamic random access memory, static random access memory, an optical disk, a magnetic disk, etc. Instructions 730 may enable a device, in response to their execution by the device, to perform various location detection related operations described herein. For example, storage medium 720 may include instructions 730 configured to cause a device to practice some or all aspects of dead zone detection and report of process 300 of FIG. 3, in accordance with embodiments of the present disclosure.

The following paragraphs describe examples of various embodiments.

Example 1 is an apparatus for dead zone location detection which may include a receiver configured to receive radio signals, and provide indicators that convey signal strength of received radio signals, wherein the received radio signals may be considered degraded when signal strength of the received radio signals is below a threshold level; and a location detector, coupled with the receiver, configured to determine which dead zone the apparatus is currently located, in response to a determination that receipt of radio signals is degraded.

Example 2 may include the subject matter of Example 1, and further specifies that the location detector may be configured to determine which dead zone the apparatus is currently located, based at least in part on known dead zones around a last known location of the apparatus that is deemed accurate, and motion information of the apparatus subsequent to the last known location of the apparatus deemed accurate.

Example 3 may include the subject matter of Example 2, and further specifies that the location detector may be configured to select the known dead zones around the last known location deemed accurate, from multiple predefined dead zones within a range of the last known location deemed accurate.

Example 4 may include the subject matter of Example 2, and further specifies that the motion information may include velocity information, and, the location detector may be further configured to select the range based at least in part on the velocity information, and an amount of elapsed time since the last known location of the apparatus deemed accurate is recorded.

Example 5 may include the subject matter of Example 2, and further specifies that the location detector may be further configured to determine a location of the apparatus through trilateration or fingerprinting, wherein the last known location deemed accurate is a location of the apparatus last determined by the location detector.

Example 6 may include the subject matter of Example 2, and may further include a motion detector coupled with the location detector and configured to provide motion information of the apparatus including the motion information of the apparatus subsequent to the last known location of apparatus deemed accurate.

Example 7 may include the subject matter of Example 6, and further specifies that the motion information may include vertical acceleration information of the apparatus.

Example 8 may include the subject matter of any preceding Examples, and further specifies that the apparatus may be a computing device having: memory configured to store instructions configured to implement the location detector; and a processor, coupled with the receiver and the memory, and configured to execute the instructions to operate the location detector.

Example 9 may include the subject matter of any preceding Examples, and further specifies that the apparatus may be a selected one of a mobile phone, a smartphone, personal digital assistant, an ultra mobile computer, a tablet computer, a subnotebook computer, a notebook computer, a game player, a camera, a music player, a voice recorder, or a video recorder.

Example 10 is a method for dead zone location detection which may include: sensing, by a computing device, a degradation of signals sent by one or more wireless devices; retrieving, by the computing device, a last known location of the computing device; and determining, by the computing device, a current location of the computing device among one or more dead zones near the last known location.

Example 11 may include the subject matter of Example 10, and may further include obtaining, by the computing device, motion information of the computing device.

Example 12 may include the subject matter of Example 11, and further specifies that the motion information may include vertical acceleration information of the computing device.

Example 13 may include the subject matter of Example 11, and may further include calculating, by the computing device, a lookup range from the last known location based at least in part on the motion information of the computing device and a time lapse since the computing device moving away from the last known location.

Example 14 may include the subject matter of Example 13, and may further include retrieving, by the computing device, a list of predefined dead zones within the lookup range from the last known location.

Example 15 may include the subject matter of Example 14, and may further include selecting the dead zone, by the computing device, from the list of predefined dead zones based at least in part oil a motion pattern of the computing device.

Example 16 may include the subject matter of any of Examples 10-15, and may further include reporting, by the computing device, the location of the computing device in the dead zone.

Example 17 may include the subject matter of Example 16, and further specifies that the reporting may include presenting information of the location of the computing device in the dead zone to a user via a selected one of audio output, visual output, or tactile output.

Example 18 may include the subject matter of Example 16, and further specifies that the reporting may include presenting information of the location of the computing device in the dead zone in a map.

Example 19 is one or more machine readable storage medium having multiple instructions configured to enable a controller of a computing device, in response to execution of the multiple instructions by the controller, to determine a location of the computing device in a dead zone near a last known location based at least in part on a list of predefined dead zones near the last known location in response to a determination that received radio signals are degraded. The received radio signals may be considered degraded when signal strength of the received radio signals is below a threshold level.

Example 20 may include the subject matter of Example 19, and further specifies that the multiple instructions are configured to enable the controller, in response to execution of the multiple instructions by the controller, to obtain motion information of the computing device. The location of the computing device in the dead zone may be determined based at least in part on the motion information of the computing device.

Example 21 may include the subject matter of Example 19 or 20, and further specifies that the multiple instructions are configured to enable the controller, in response to execution of the multiple instructions by the controller, to report the location of the computing device in the dead zone based at least in part on information of the dead zone.

Example 22 is an apparatus for wireless communication, including detection of a dead zone location of the apparatus. The apparatus may include means for receiving radio signals and providing indicators that convey signal strength of received radio signals, wherein the received radio signals are considered degraded when signal strength of the received radio signals is below a threshold level; and means for determining which dead zone the apparatus is currently located, in response to a determination that receipt of radio signals is degraded.

Example 23 may include the subject matter of Example 22, and further specifies that the means for determining which dead zone the apparatus is currently located may include means for retrieving a last known location of the apparatus.

Example 24 may include the subject matter of Example 22, and further specifies that the means for determining which dead zone the apparatus is currently located may include means for obtaining motion information of the apparatus.

Example 25 may include the subject matter of any of Examples 22-24, and further specifies that the means for determining which dead zone the apparatus is currently located may include means for calculating a look-up range from the last known location based at least in part on the motion information of the apparatus and a time lapse since the apparatus moving away from the last known location.

Example 26 may include the subject matter of Example 25, and further specifies that the means for determining which dead zone the apparatus is currently located may include means for retrieving a list of predefined dead zones within the lookup range from the last known location.

Example 27 may include the subject matter of Example 26, and further specifies that the means for determining which dead zone the apparatus is currently located may include means for selecting the dead zone from the list of predefined dead zones based at least in part on a motion pattern of the apparatus.

Computer-readable media (including non-transitory computer-readable media), methods, systems and devices for performing the above-described techniques are illustrative examples of embodiments disclosed herein. Additionally, other devices in the above-described interactions may be configured to perform various disclosed techniques. Thus, apparatus, methods and storage medium associated with dead zone detection have been described.

Although certain embodiments have been illustrated and described herein for purposes of description, a wide variety of alternate and/or equivalent embodiments or implementations calculated to achieve the same purposes may be substituted for the embodiments shown and described without departing from the scope of the present disclosure. This application is intended to cover any adaptations or variations of the embodiments discussed herein. Therefore, it is manifestly intended that embodiments described herein be limited only by the claims.

Where the disclosure recites "a" or "a first" element or the equivalent thereof such disclosure includes one or more such elements, neither requiring nor excluding two or more such elements. Further, ordinal indicators (e.g., first, second or third) for identified elements are used to distinguish between the elements, and do not indicate or imply a required or limited number of such elements, nor do they indicate a particular position or order of such elements unless otherwise specifically stated.

What is claimed is:

1. An apparatus, comprising:
   a receiver, coupled with the apparatus, to sense a degradation of radio signals send by a plurality of wireless devices, wherein to sense the degradation of radio signals, the receiver is to consider the radio signals degraded when signal strength of the radio signals is below a threshold level;
   a motion detector, coupled with the apparatus, to determine a motion characteristic of the apparatus, wherein to determine the motion characteristic of the apparatus, the motion detector is to determine a motion characteristic of the apparatus subsequent to a last known location of the apparatus;
   a location detector, coupled with the receiver, to determine a current location of the apparatus, wherein to determine the current location of the apparatus the location detector is to determine the current location of the apparatus among one or more dead zones near a last know location of the apparatus, determine a lookup range relative to the last known location of the apparatus based at least in part on the motion characteristic of the computing device and a time lapse since the computing device moved away from the last known location, retrieve a list of predefined dead zones within the lookup range from the last known location, which list comprises characteristics of the dead zones, select a dead zone the apparatus is currently located in or near from the list of predefined dead zones based at least in part on the motion characteristic of the apparatus, and a characteristic of the one or more dead zones.

2. The apparatus according to claim 1, wherein the characteristic of the dead zone is a motion characteristic and wherein the location detector is to select the dead zone the apparatus is currently located in or near based at least in part on correspondence between the motion characteristic of the apparatus and the motion characteristic of the dead zone.

3. The apparatus according to claim 1, wherein the motion characteristic of the apparatus includes velocity information from internal motion sensors, and the location detector is further configured to determine the lookup range based at least in part on the velocity information.

4. The apparatus according to claim 1, wherein the location detector is further to determine a location of the apparatus through trilateration, fingerprinting, or dead reckoning, wherein the last known location is a location of the apparatus last determined by the location detector.

5. The apparatus according to claim 1, wherein the motion characteristic comprises a pattern of motion of the apparatus, including horizontal and vertical acceleration information of the apparatus.

6. The apparatus according to claim 1, wherein the apparatus is a computing device, comprising:
   memory configured to store instructions configured to implement the location detector; and
   a processor, coupled with the receiver and the memory, and configured to execute the instructions to operate the location detector.

7. The apparatus according to claim 6, wherein the apparatus is a selected one of a mobile phone, a smartphone, a personal digital assistant, an ultra mobile computer, a tablet computer, a subnotebook computer, a notebook computer, a game player, a camera, a music player, a voice recorder, or a video recorder.

8. A method, comprising:
   sensing, by a computer device, a degradation of signals sent by a plurality of wireless devices;
   retrieving, by the computer device, a last known location of the computer device;
   determining, by the computer device, a current location of the computer device among one or more dead zones near the last known location
   determining, by the computer device, a motion characteristic of the computer device;
   calculating, by the computer device, a lookup range from the last known location based at least in part on the motion characteristic of the computer device and a time lapse since the computer device moved away from the last known location;
   retrieving, by the computer device, a list of predefined dead zones within the lookup range from the last known location, which list comprises characteristics of the dead zones; and
   selecting the dead zone, by the computer device, from the list of predefined dead zones based at least in part on the motion characteristic of the computer device and the characteristic of the dead zone.

9. The method of claim 8, wherein the characteristic of the dead zone is a motion characteristic.

10. The method of claim 8, further comprising:
    reporting, by the computer device, the location of the computer device in the dead zone.

11. The method of claim 10, wherein reporting comprises presenting information of the location of the computer device in the dead zone to a user via a selected one of audio output, visual output, or tactile output.

12. The method of claim 10, wherein reporting comprises presenting information of the location of the computer device in the dead zone in a map.

13. One or more non-transient machine readable storage media having a plurality of instructions configured to enable a controller of a computer device, in response to execution of the plurality of instructions by the controller, to:

sense, by the computer device, a degradation of signals sent by a plurality of wireless devices;

retrieve, by the computer device, a last known location of the computer device;

determine, by the computer device, a current location of the computer device among one or more dead zones near the last known location;

determine, by the computer device, a motion characteristic of the computer device;

calculate, by the computer device, a lookup range from the last known location based at least in part on the motion characteristic of the computer device and a time lapse since the computer device moved away from the last known location;

retrieve, by the computer device, a list of predefined dead zones within the lookup range from the last known location, which list comprises characteristics of the dead zones; and select the dead zone, by the computer device, from the list of predefined dead zones based at least in part on the motion characteristic of the computer device and the characteristic of the dead zone.

14. The one or more non-transient machine readable storage media according to claim 13, wherein the characteristic of the dead zone is a motion characteristic.

15. The one or more non-transient machine readable storage media according to claim 13, wherein the plurality of instructions are configured to enable the controller, in response to execution of the plurality of instructions by the controller, to:

report the location of the computer device in the dead zone based at least in part on information of the dead zone.

* * * * *